(12) United States Patent
Vasshus et al.

(10) Patent No.: US 10,226,720 B2
(45) Date of Patent: Mar. 12, 2019

(54) CLEANING DEVICE FOR SEPARATING HYDROCARBONS FROM SOLID PARTICLES

(75) Inventors: Jan Kristian Vasshus, Sandnes (NO); Arne Malmin, Kleppe (NO)

(73) Assignee: Cubility AS, Sandnes (NO)

( * ) Notice: Subject to any disclaimer, the term of this patent is extended or adjusted under 35 U.S.C. 154(b) by 483 days.

(21) Appl. No.: 13/878,528

(22) PCT Filed: Sep. 29, 2011

(86) PCT No.: PCT/NO2011/000277
§ 371 (c)(1),
(2), (4) Date: Apr. 9, 2013

(87) PCT Pub. No.: WO2012/050456
PCT Pub. Date: Apr. 19, 2012

(65) Prior Publication Data
US 2013/0193090 A1  Aug. 1, 2013

Related U.S. Application Data

(60) Provisional application No. 61/392,810, filed on Oct. 13, 2010.

(30) Foreign Application Priority Data

Oct. 12, 2010  (NO) .................................. 20101406

(51) Int. Cl.
*E21B 21/06* (2006.01)
*B01D 29/05* (2006.01)
*B09C 1/02* (2006.01)

(52) U.S. Cl.
CPC ............ *B01D 29/05* (2013.01); *E21B 21/065* (2013.01); *E21B 21/066* (2013.01)

(58) Field of Classification Search
CPC ......... B07B 1/10; B07B 1/55; B07B 2230/04; B07B 4/08; B08B 3/04; B08B 3/10;
(Continued)

(56) References Cited

U.S. PATENT DOCUMENTS 2,266,586 A * 12/1941 Branum ................. E21B 21/066
                                                                        175/206
4,097,306 A *  6/1978 Carman ..................... C23G 1/00
                                                                        134/10
(Continued)

FOREIGN PATENT DOCUMENTS

CA          2613043 A1    11/2007
CA          2650052 A1    11/2007
(Continued)

*Primary Examiner* — Joseph L. Perrin
*Assistant Examiner* — Irina Graf
(74) *Attorney, Agent, or Firm* — Gable Gotwals

(57) ABSTRACT

An apparatus and a method is described to facilitate separation of hydrocarbons from solid particles (29) being contaminated with hydrocarbons. The apparatus (1) includes a container (3) having a closeable inlet portion (20) for solid particles; a support body (11) in fluid communication with the closeable inlet portion (20), where the support body (11) is arranged to carry the solid particles (29) led in through the inlet portion (20), as the container is connected to an under-pressure generating device (7) to provide an under-pressure in the container (3).

9 Claims, 5 Drawing Sheets

(58) Field of Classification Search
CPC ........... B08B 3/022; B08B 1/02; B08B 3/041; E21B 21/065; E21B 21/066; B01D 11/0226; B01D 11/0261; B01D 11/0223
See application file for complete search history.

(56) References Cited

U.S. PATENT DOCUMENTS

| | | | | |
|---|---|---|---|---|
| 4,453,319 A * | 6/1984 | Morris | ................. | E21B 21/065 134/19 |
| 5,216,821 A * | 6/1993 | McCabe | ................. | B01J 19/20 34/180 |
| 5,242,245 A * | 9/1993 | Schellstede | ............... | B09C 1/06 110/346 |
| 5,413,129 A * | 5/1995 | Shenoi | ................. | B09B 3/0091 134/102.1 |
| 5,454,878 A * | 10/1995 | Bala | ......................... | B09C 1/02 134/10 |
| 5,544,975 A * | 8/1996 | Vigneron | .................. | B09C 1/02 134/25.1 |
| 5,882,524 A * | 3/1999 | Storey | ....................... | B03B 9/02 134/10 |
| 5,941,468 A * | 8/1999 | Lewis | ..................... | A61L 11/00 241/17 |
| 6,170,580 B1 | 1/2001 | Reddoch | | |
| 6,226,889 B1 * | 5/2001 | Aulbaugh | ................. | B09B 3/00 110/229 |
| 7,306,057 B2 * | 12/2007 | Strong | ................ | B01D 17/0211 134/25.1 |
| 8,017,021 B1 * | 9/2011 | Staples | .............. | B02C 18/0092 210/173 |
| 2002/0033550 A1 * | 3/2002 | Suehara | .............. | B29C 45/0001 264/140 |
| 2003/0010723 A1 * | 1/2003 | Fox | ...................... | B01D 29/096 210/739 |
| 2005/0056300 A1 * | 3/2005 | Taylor-Smith | ..... | B01D 11/0226 134/1 |
| 2005/0183994 A1 | 8/2005 | Hensley et al. | | |
| 2006/0096119 A1 | 5/2006 | Schellstede | | |
| 2008/0178953 A1 * | 7/2008 | Weenum | ............ | B65G 53/4633 137/625.46 |
| 2008/0223760 A1 | 9/2008 | Vasshus et al. | | |
| 2008/0223777 A1 | 9/2008 | Vasshus et al. | | |
| 2009/0107931 A1 * | 4/2009 | Vasshus | ................. | B01D 33/04 210/808 |
| 2009/0211106 A1 * | 8/2009 | McKenzie | ............ | E21B 21/066 34/92 |
| 2010/0170859 A1 * | 7/2010 | Fout | ..................... | B01D 29/356 210/787 |

FOREIGN PATENT DOCUMENTS

| | | |
|---|---|---|
| EP | 0997607 | 5/2000 |
| EP | 1054135 | 11/2000 |
| NO | 155832 | 3/1987 |
| NO | 322684 | 11/2006 |
| NO | 323519 B1 | 1/2007 |
| NO | 20053230 A | 1/2007 |
| NO | 20061830 A | 10/2007 |
| NO | 326594 B1 | 1/2009 |
| NO | 329915 | 1/2011 |
| WO | 99/28591 | 6/1999 |
| WO | 00/49269 | 8/2000 |
| WO | 01/22050 | 3/2001 |
| WO | 02/32542 | 4/2002 |
| WO | 2006098638 A1 | 9/2006 |
| WO | 2007/123410 | 11/2007 |
| WO | 2010/048718 | 5/2010 |

\* cited by examiner

CLEANING DEVICE FOR SEPARATING HYDROCARBONS FROM SOLID PARTICLES

CROSS-REFERENCE TO RELATED APPLICATIONS

This United States National Phase of PCT Application No. PCT/NO2011/000277 filed 29 Sep. 2011, claims priority to Norwegian Patent Application No. 20101406 filed 12 Oct. 2010 and to U.S. Provisional Application No. 61/392,810 filed 13 Oct. 2010, each of which are incorporated herein by reference.

BACKGROUND OF THE INVENTION

The present invention relates to a cleaning device. More particularly it concerns an apparatus and a method for facilitating separation of hydrocarbons from solid particles being contaminated with hydrocarbons.

Hydrocarbon fluids bound to solid particles may be released to the environment and thus be polluting and representing a health risk. A need will therefore exist to, in a controlled manner, be able to separate hydrocarbons from solid particles.

Typical examples of solid particles containing hydrocarbon fluids are: drill cuttings being brought up from a well being drilled in a hydrocarbon carrying zone; so-called oil sand; and hydrocarbon mixed into loose solid particles as a consequence of uncontrolled oil spill. The latter may for example be a littoral zone soiled by oil spill at sea, or sediments on a seabed contaminated by hydrocarbons.

The following description is particularly directed toward cleaning of drill cuttings being brought out of a well in connection with drilling of a petroleum well.

It is however to be understood that the invention is not limited to cleaning of drill cuttings but is useful for cleaning of contaminated solid particles of such as the kind mentioned above.

In drilling of a petroleum well there may be drilled using water based drilling liquids until the drilling gets close to a hydrocarbon-carrying zone. The drill cuttings being brought to the surface may contain other contaminants than hydrocarbons desired removed by means of the present invention. Such contaminants may be such as polymers and salts.

When drilling into a hydrocarbon-carrying zone, drill cuttings being brought up from the well will contain hydrocarbons. Depending on the rock type the drill cuttings may contain relatively large amounts of hydrocarbons that may be difficult to separate from the solid particles. So-called sandstone is a type of drill cuttings difficult to clean of hydrocarbons.

Due to the danger of pollution the authorities in some countries require that drill cuttings contaminated with hydrocarbons and/or other matters considered harmful to the environment shall be cleaned before it is allowed to be deposited. Alternatively requirements may be made to the drill cuttings being deposited in specially prepared disposal sites. Such specially prepared disposal sites are very costly to prepare, require much space and may require transportation of drill cuttings over great distances.

To comply with authority requirements it is known to carry out a thermal treatment of drill cuttings in special processing plants. In such a cleaning process the drill cuttings are heated to such a high temperature that the hydrocarbons "boil off" to the largest possible extent. To remove hydrocarbons from porous solid particles requires a relatively long retention period and large amounts of energy. For this reason the installations need to be large, and they are therefore located in shore-based plants. The hydrocarbon containing solid particles must thus be brought to the cleaning plants from such as a drilling rig offshore. This is time consuming, costly and not very friendly to the environment.

The object of the invention is to remedy or reduce at least one of the disadvantages of prior art, or at least to provide a useful alternative to prior art.

The object is achieved by the features disclosed in the below description and in the subsequent claims.

According to a first aspect of the present invention there is provided an apparatus to facilitate separation of hydrocarbons from solid particles contaminated with hydrocarbons, where the apparatus includes:

a container having a closable inlet portion for solid particles; and a supporting body in fluid communication with the closable inlet portion, wherein the supporting body is arranged to be able to carry the solid particles led in through the inlet portion, and wherein the container is connected to an under-pressure generating device to provide an under-pressure in the container.

This has several advantageous effects.

A person skilled in the art will know that vapour pressure is the pressure of vapour in equilibrium with its own phase state as liquid or solid. At a certain temperature for a certain substance there is a pressure where the gas of the substance is in dynamic equilibrium with the liquid phase or the solid phase of the substance. This is the vapour pressure of the substance at this temperature. By inducing under-pressure in the container the vapour pressure and thereby the boiling point for the hydrocarbons is lowered. This causes the hydrocarbons to be liberated or vapourized from the solid particles at a lower temperature than what the case is for hydrocarbon contaminated solid particles at atmospheric pressure, and the apparatus exhibits a better efficiency and may therefore be made in a smaller size compared to apparatuses operating at atmospheric pressure.

The under-pressure, or how much the pressure is lowered relative to atmospheric pressure, will have to be adapted to the properties of the fluid(s) desired to be cleaned from the solid particles and to the temperature of the fluids to be cleaned. The relationship between temperature and vapour pressure for relevant fluids is fixed, and will be available to a person skilled in the art.

By the very fact that the apparatus may be made smaller it may be located for example on a drilling rig offshore or at a drilling rig onshore. The apparatus may thus be located relatively close downstream of the well bore. This may be very advantageous energy efficiency wise, which will be explained below.

The apparatus may also become a part of a mobile plant, which may be moved to a desired location for example in connection with cleaning of a beach contaminated with oil.

A person skilled in the art will know that drill cuttings being brought out of a well being drilled within the petroleum industry, may have a temperature in the order of 30-60° C. higher than the ambient temperature. In a drilling process several dozens of tons of drill cuttings and drilling mud may be brought up every hour. By utilizing the high temperature of the drill cuttings in the cleaning process, much energy may be saved that otherwise might have to be added to the drill cuttings in the cleaning process of same.

By cleaning on site, the authorities in some countries may allow the cleaned drill cuttings to be returned to the sea or to a land area in the vicinity of the drilling area when we are talking about a land well. Thus the need to transport the drill cuttings over great distances will be eliminated, which among other things holds a considerable economical and environmental profit. The handling of the drill cuttings on board a drilling rig may also be simplified, reducing risks of personnel injuries.

By carrying out the cleaning process at under-pressure, evaporations injurious to health from the drill cuttings may be handled in a controlled manner by means of further cleaning and/or condensation, or the evaporations may be led to the surrounding environment at a distance from personnel.

The support body may be located at a distance from the in all material aspects inside of the container shell portion. This may facilitate draining of hydrocarbons both liquid and gaseous from the solid particles, particularly if at least a portion of the support body is fluid permeable.

A first sluice device arranged to be able to sluice the solid particles into the container may constitute the closable inlet portion. A sluice device will be able to make it possible to let hydrocarbon contaminated solid particles into the container without "puncturing" the under-pressure and without gases injurious to health leaking out of the container through the inlet or outlet portions.

In one embodiment the solid particles are brought out of the container through the inlet portion. The inlet portion will then serve as both inlet portion and outlet portion for the solid particles.

In an alternative embodiment the apparatus further includes a closable inlet portion for solid particles, and where the outlet portion is in fluid communication with the support body. The closable outlet portion may be constituted by a second sluice device arranged to be able to sluice the solid particles out of the container.

By sluicing the solid particles in through said first sluice device and out through said second sluice device, solid particles may be led continuously through the container at the same time as the under-pressure is maintained. A greater under-pressure may thus be produced in the container, or the under-pressure generating device may be provided with a smaller motor.

It may be an advantage if the container is further allocated a gas supply device arranged to be able to compensate for gas being evacuated from the container by means of the under-pressure generating device, and a draining device for liquid being separated from the drill cuttings during the cleaning process in the container.

The apparatus may be provided with a device to be able to increase the temperature of the solid particles. An increased temperature in the drill cuttings will increase the evaporation and thereby the efficiency of the apparatus. The temperature-increasing device may be at least one of a heat source or a radiation device giving off radiation in the microwave range.

In one embodiment the apparatus is further connected to at least one fluid source for the supply of at least one fluid arranged to be able to facilitate separation of the hydrocarbons and the solid particles. The fluid may have suitable surface-active properties and may as for instance a washing agent, be added to increase the efficiency of the apparatus. The fluid may be one of or a combination of two or more of water in the liquid state or gas state, a fat dissolving medium such as, but not limited to, a soap or citrus, an oil, air or a gas such as, but not limited to, methane, ethane, propane or butane.

It has turned out to be advantageous if the fluid is used in combination with a temperature-raising device, and particularly in combination with a radiation source producing radiation in the microwave range.

The apparatus may be provided with an oscillating device arranged to be able to set at least a part of the support body in a vibrating motion such that the solid particles being supported by the support body are also stirred relative to the support body. This has the effect that the exposure of the solid particles to the under-pressure is increased, at the same time as tests carried out may also indicate that the binding between the solid particles and the liquid state hydrocarbons are reduced when the drill cuttings are vibrated or stirred and cold vapour may be formed. In said test the oscillating device was an ultrasonic source.

In one embodiment of the present invention the apparatus is located downstream of a strainer device of a per se known kind in such a way that the strainer device outlet portion for solid particles is connected to the inlet portion of the apparatus.

To avoid that hydrocarbons in the gaseous state are mixed into the surrounding environment, it is advantageous if the connection between said strainer apparatus and the apparatus according to the invention is fluid tight.

The strainer apparatus may be a vibratory strainer apparatus, a so-called shale shaker of a per se known kind, or it may be an apparatus of the kind described in the applicant's patent NO323519.

In an alternative embodiment the container may be further provided with a strainer apparatus where at least a portion of the support body is constituted by a strainer cloth connected to the strainer apparatus. The strainer apparatus may for example be of the kind described in said NO323519.

In a second aspect of the invention there is provided a method to facilitate separation of hydrocarbons from solid particles contaminated with hydrocarbons, wherein the method includes the steps of:
  bringing the contaminated solid particles into a container through a closable supply portion and to a support body;
  exposing the solid particles to an under-pressure;
  bringing the solid particles out through a closable outlet portion in the container; and
  directing the hydrocarbons separated from the solid particles out of the container.

In one embodiment the supply portion of the container is located spaced apart from the outlet portion. The solid particles may in such a solution be brought from the supply portion to the outlet portion by means of the support body.

In one embodiment an inlet portion of the container is connected to an outlet portion of a strainer apparatus of a per se known kind. In an alternative embodiment said strainer apparatus is located integrated in the container between the inlet portion and the outlet portion of the container.

In the following is described an example of a preferred embodiment illustrated in the accompanying drawings, wherein.

Figure 1:
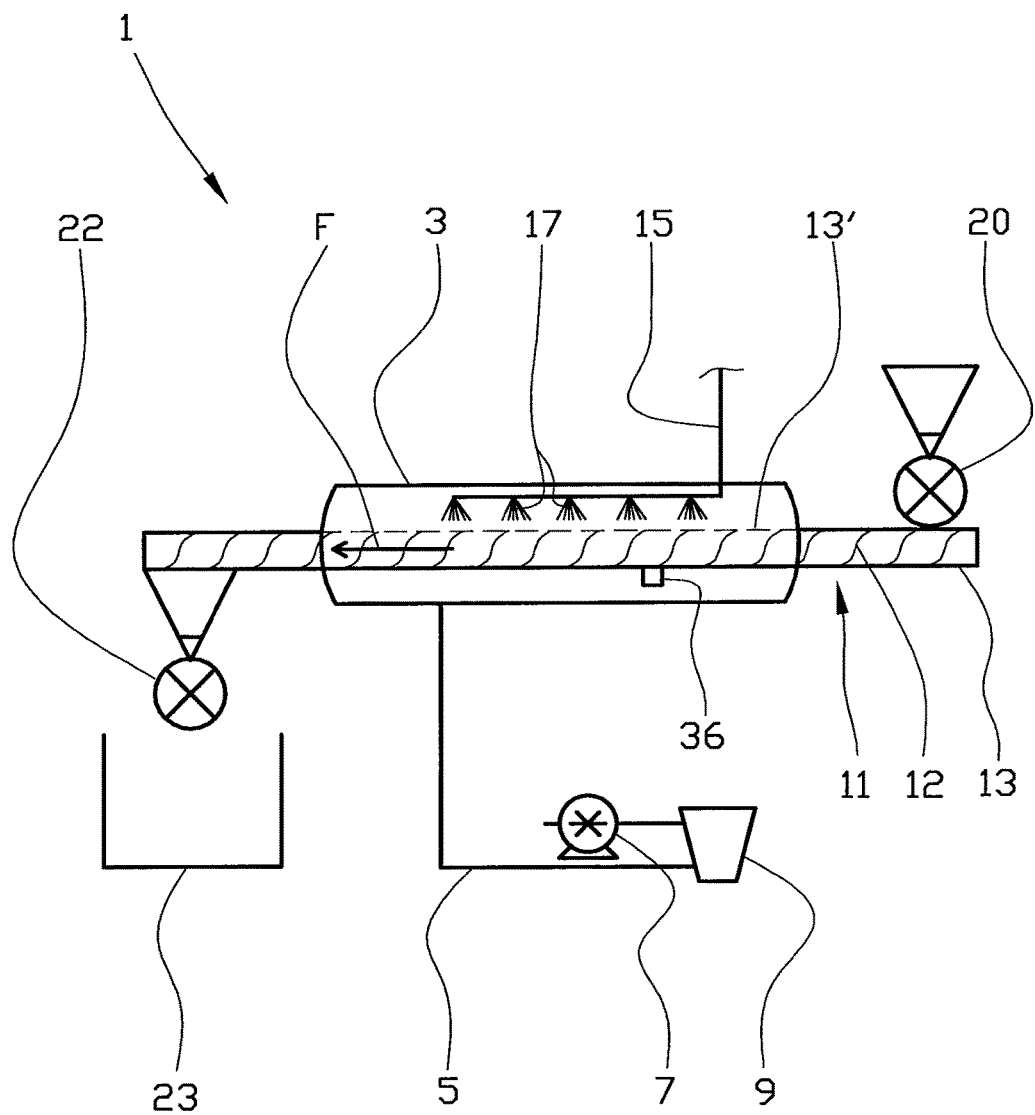
FIG. 1 shows a principle sketch of an apparatus according to a first embodiment of the present invention.

It is to be understood that the figures are only principle sketches and that only the parts necessary to understand the invention are shown. Moreover a person skilled in the art will understand that the sketches may be distorted regarding mutual proportions between the parts shown.

Indications of mutual locations of the individual parts, such as "above", "below", "right" and "left" relates to the position of the parts as shown in the drawings.

Equal or equivalent parts may be indicated by the same reference numeral in the drawings.

In the figures the reference numeral 1 indicates an apparatus according to the present invention, where the apparatus comprises a closed container 3, which via a line 5 is in fluid communication with an under-pressure generating device in the form of a vacuum pump 7.

In FIG. 1 a knock-out drum 9 is placed in a portion of the line 5 between the container 3 and the vacuum pump 7. The object of the knock-out drum 9 is to separate liquid from the fluid flow from the container 3 that otherwise would be carried through the vacuum pump 7.

The knock-out drum 9 is provided with a not shown draining device leading separated liquid to a collection container or to further cleaning. At least a share of the separated liquid may be added to a drilling liquid being re-circulated into a well. The separated liquid may be added without further cleaning, or possibly after further cleaning is carried out. Whether or not further cleaning is to be carried out depends on the properties of the separated liquid compared to the properties of the drilling liquid.

A downstream portion of the vacuum pump 7 may correspondingly be connected to a cleaning device or it may end in an outlet. The outlet is preferably at a safe distance from personnel and potentially dangerous technical installations.

A support body 11 extends through the container 3 and some way out from the left and right sides of it. The support body 11 is constituted, in the embodiment shown in FIG. 1, of a feed screw 12 of a per se known kind arranged coaxially with a holding device 13, 13'.

Outside the container 3 that is to the right and left of the container 3 shown in FIG. 1, the holding device 13 is constituted by a tubular body completely surrounding the feed screw 12. The holding device 13 may be attached to the end portions of the container 3 for example by means of a welded connection providing a fluid tight connection.

Between the end portions of the container 3 the holding device 13' is constituted by a U-shaped body having its opening facing upwards. The open portion of the body 13' is for illustrative purposes shown in a dotted line in FIG. 1.

The object of this open holding device 13' is to be able to expose the drill cuttings being led through the container 3 by means of the feed screw 12 to an under-pressure being produced by means of the vacuum pump 7. In addition the open holding device 13' provides an evacuation path for the hydrocarbons evaporating from the solid particles, and also an exposure of the drill cuttings to cleaning fluids that may be introduced into the container 3 through a cleaning fluid supply line 15. In the embodiment shown the cleaning fluid supply line 15 is connected to a spreader device (such as a manifold) in the form of a number of nozzles 17 (five shown) arranged to be able to spread the cleaning fluid along at least portions of the open holding device 13'.

The lower portion of the open holding device 13' may be constituted by for example a truncated pipe. Alternatively the lower portion of the open holding device 13' may be provided with one or more perforated portions such that hydrocarbons evaporating from the solid particles will be able to evacuate from the holding device 13' also through the lower portion of the open holding device 13'. The perforated portions may for example be constituted by a screening cloth or a perforated, truncated pipe, or by other bodies allowing fluid flow at the same time as they are able to carry the solid particles being carried in the holding device 13' by means of the feed screw 12.

In FIG. 1 the drill cuttings are fed from right to left. The feeding direction is illustrated by an arrow F.

A first sluice device 20 is connected to an upstream that is a right end portion of the support body 11. The purpose of the sluice device 20 is to be able to dose solid particles into the support body 11, but without air being sucked continuously in through the sluice device 20. The sluice device 20 is of a per se known kind and will therefore not be discussed further. For example, a sluicing device that includes a multi-vane rotor such as a rotary valve or rotary air lock feeder, is a suitable sluicing device 20 (and 22).

A second sluice device 22 is connected to a downstream that is a left, end portion of the support body 11. The purpose of the sluice device 22 is to be able to carry solid particles out of the support body 11, but without air being sucked continuously in through the sluice device 22. Like the sluice device 20 the sluice device 22 is also of a per se known kind and will therefore not be discussed further.

Even if the sluice device 22 is to be preferred, the apparatus according to the invention will also be able to function without it and possibly without a completely closed carrying device 11 in a downstream portion of the container 3. But then air may be sucked in through the support body 11 and a more powerful vacuum pump 7 will be required to be able to maintain the desired under-pressure in the container 3.

Solid particles cleaned of hydrocarbons are collected in a buffer container 23. The collected solid particles may, depending on the degree of cleaning be deposited without further cleaning.

A share of the hydrocarbons "boiling off" as they are carried through the container 3 in under-pressure, or evaporate from the solid particles before any boiling takes place, may be condensed in the container 3. Condensed hydrocarbons may be drained out of a bottom portion of the container 3. In the embodiment shown separated hydrocarbons are drained out through the line 5 connected to the vacuum pump 7. The liquid fraction of the hydrocarbons is separated out by means of the knock-out drum 9 of a per se known kind. The knock-out drum 9 is in fluid communication with a not shown container or vessel for collection and further handling. In an alternative but not shown, embodiment the container 3 is emptied for condensed hydrocarbons by means of a drain pump and led to a container or vessel for collection and further handling.

Figure 2:
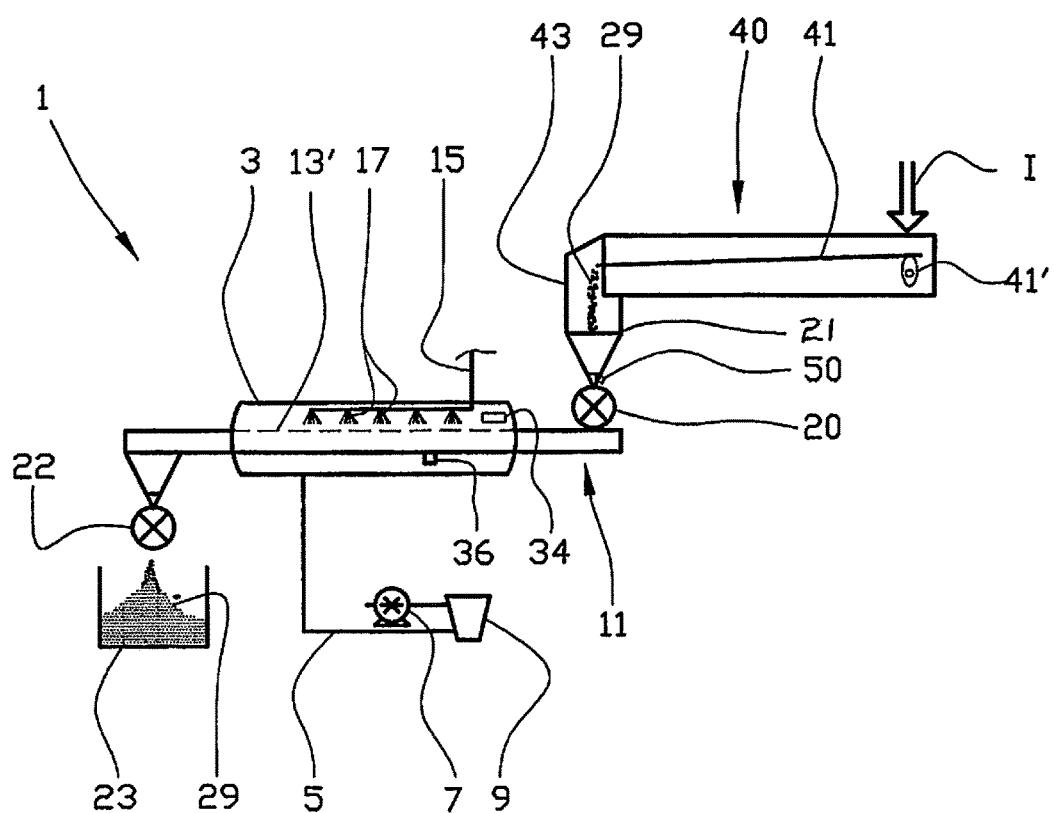
FIG. 2 shows at a smaller scale the apparatus of FIG. 1 arranged downstream of a strainer apparatus according to prior art.

In FIG. 2 the apparatus of FIG. 1 is shown arranged connected to a strainer apparatus 40 of the kind that is commonly used in the petroleum industry to retrieve valuable drilling mud from the drill cuttings 29. Drilling mud will in the following also be referred to as liquid fraction, while drill cuttings will also be referred to as solid particles of solid fraction. The strainer apparatus 40 is in the Figure only shown largely in principle as a vibration strainer apparatus, a so-called shale shaker, including at least one stationary screening cloth 41 being set in oscillating movement by means of an off-set clump weight 41'. A person skilled in the art will know that drill cuttings 29 and drilling mud being circulated up from the well, are led into the strainer apparatus 40 as shown by the arrow I. As the drill cuttings 29 and the drilling mud is moving down the strainer cloth 41, the liquid fraction is separated from the solid particles larger than the mesh width of the strainer cloth 41. The liquid fraction is collected and recovered, while the solid particles are led out of the apparatus 40 through an outlet portion 43. In the embodiment shown the outlet portion 43 is in fluid tight communication with the first sluice device 20 of the apparatus 1, with an inlet end 21 connected to the outlet portion 43. The solid particles being led out of the outlet portion 43 of the screening apparatus 40 are thus led into the first sluice device 20 of the apparatus 1 and further into it as explained above.

The strainer apparatus may as an alternative to a strainer apparatus 40 of the shale shaker type be a strainer apparatus including an endless strainer cloth rotating around turning rollers as appearing from the applicant's Norwegian patent NO 323519.

A person skilled in the art will know that the strainer apparatus 40 is located relatively immediately downstream of an outlet portion of a well being drilled. The strainer apparatus 40 will thus receive drill cuttings 29 having a relatively high temperature, typically 30-60° C. higher temperature than the ambient temperature on the drilling rig. By locating the apparatus 1 according to the invention in connection with the strainer apparatus 40, this high temperature will be utilized in the cleaning process.

It may however be desirable to further increase the temperature of the drill cuttings to be cleaned of hydrocarbons. Such a further temperature increase may be provided by locating a temperature-increasing device in connection with the apparatus 1. In the embodiment shown in FIG. 2 the temperature increase is provided partly by means of steam 62 supplied via a nozzle arranged in the first sluice device 20, and partly by means of a radiation device 34 placed inside the container 3 and directed toward the support body 11. The radiation device 34 is preferably a microwave source.

For further increase in separation of hydrocarbons from the solid particles being led through the container 3 by means of the support body 11, an oscillating source 36 is located to a portion of the open support device 13' of the support body 11. The oscillating source 36 may be an ultrasonic source, which via the holding device 13' transmits vibratory movement to the drill cuttings 29 being driven through the holding device 13' by the feed screw 12, such that the drill cuttings 29 are also moved relative to the support body 11. This has turned out to have an "airing" effect so that the exposure of the drill cuttings to the under-pressure is increased.

Figure 3:
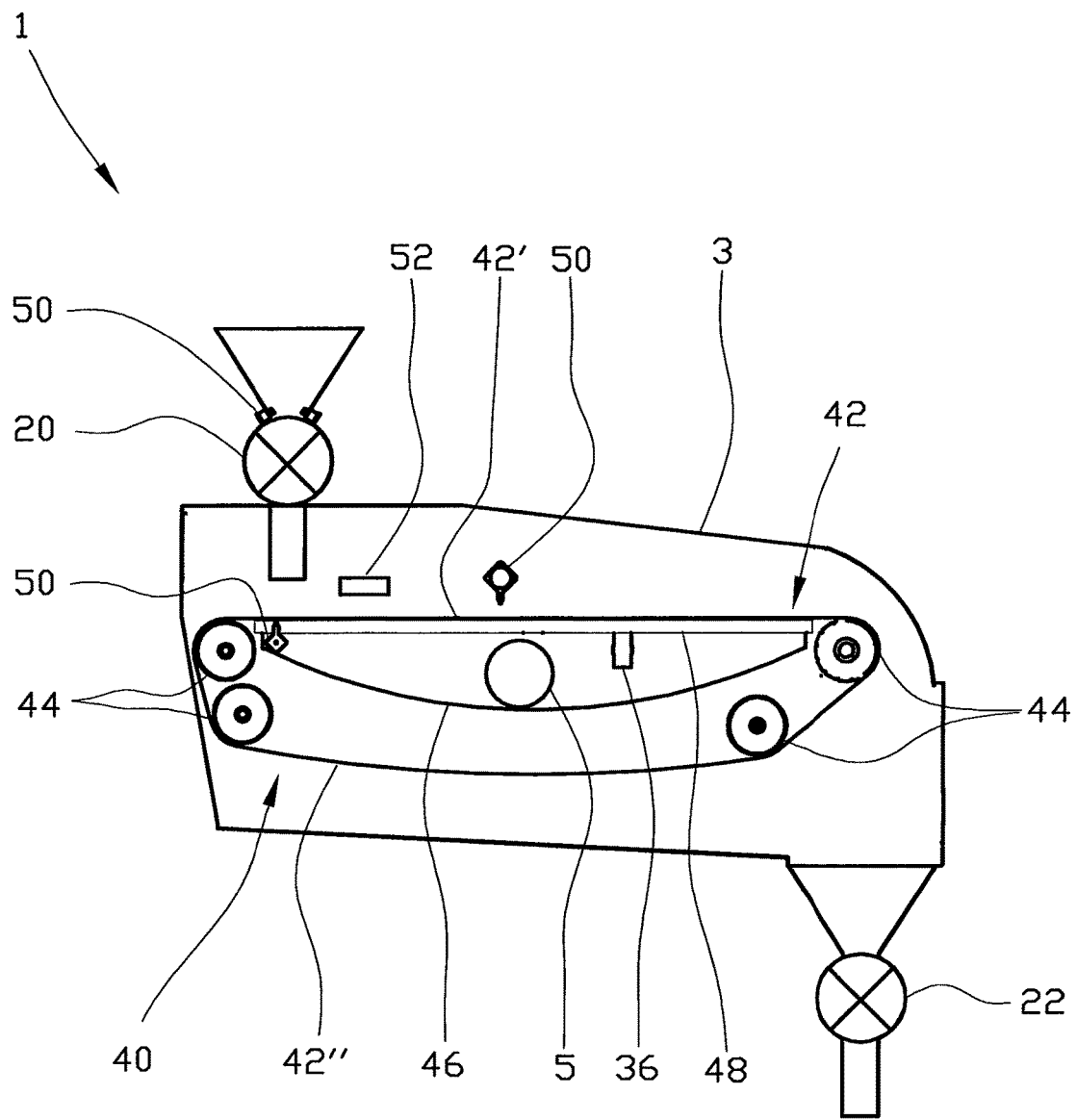
FIG. 3 shows an apparatus according to the present invention wherein a strainer device is arranged in the apparatus.

In FIG. 3 is shown an alternative embodiment of the present invention where the apparatus 1 houses a strainer apparatus 40 in a closed container. The strainer apparatus 40 includes an endless strainer cloth 42 rotating around four spaced apart parallel installed turning rollers 44. In the embodiment shown the uppermost turning roller 44 to the right in the Figure is connected to a not shown motor providing a clockwise rotation of the turning roller 44 in engagement with the strainer cloth 42. The strainer cloth 42 will in the following also be referred to as the upper strainer cloth portion 42' and the lower strainer cloth portion 42", depending on where the relevant portion of the strainer cloth 42 is, relative to the turning rollers 44.

Material in the form of fluids and solid particles are led into the apparatus 1 and to the strainer cloth 42 through an inlet portion including a first sluice device 20. Material supplied to the strainer cloth 42 goes through a cleaning process while it is led to an outlet portion and out of the apparatus 1 through a second sluice device 22.

A suction device 46 is located between the upper strainer cloth portion 42' and the lower strainer cloth portion 42". The upper portion of the suction device 46 is open and positioned very close to the underside of the upper strainer cloth portion 42'. It is to be understood that the suction device 46 extends over essentially the whole length as shown and the whole width of the strainer cloth portion 42'. The suction device 46 is via a line 5 in fluid communication with a vacuum pump 7 (not shown in FIG. 3) as explained earlier.

The suction device 46 has two main objects. Firstly the suction device is to provide a fluid flow through the upper strainer cloth portion 42' to thereby provide separation of fluids from solid particles, for example drilling mud from drill cuttings. The applicant treats this in full detail in the Norwegian patent NO 323519. Secondly the suction device 46 shall be able to provide an under-pressure in the container 3 housing the strainer apparatus 40. The purpose of the under-pressure is to lower the vapour pressure of the fluids that might be attached to the solid particles being carried on the upper strainer cloth portion 42' from the inlet portion to the outlet portion. Thus the upper strainer cloth portion 42' will have the same function as the support body 11 described in the discussion of FIG. 1.

From the above a person skilled in the art will understand that the apparatus 1 will have to be supplied with a fluid to obtain a sufficient fluid flow through the strainer cloth. The fluid may be supplied through a nozzle 50 as discussed below.

In the embodiment shown the suction device 46 covers essentially all of the upper strainer cloth portion 42'. In an alternative embodiment (not shown) the suction device 46 may be positioned closer to the inlet portion than the outlet portion. The advantage of this is that an as large as possible share of the fluids being brought into the apparatus 1 together with the solid particles are removed through the suction device 46 early such that the "dry" solid particles containing remaining fluids are at least carried some distance on the strainer cloth portion 42' before being carried out of the apparatus 1 through the outlet portion. In yet another alternative embodiment (not shown) the suction device 46 is positioned closer to the outlet portion than the inlet portion. Such a solution may be particularly relevant when a washing agent is supplied to the apparatus to facilitate separation between the hydrocarbons and the solid particles. In a further alternative embodiment (not shown) two or more suction devices 46 are positioned mutually spaced against the strainer cloth portion 42'. The two or more suction devices 46 may all be positioned against an underside of the strainer cloth portion 42', or at least one may be positioned against a topside of the strainer cloth portion 42'. In yet another further alternative embodiment (not shown) two suction devices 46 are positioned having their openings facing each other but on either side of the strainer cloth portion 42'.

In the embodiment shown the underside of the strainer cloth portion 42' is supported against spacedly positioned support rods 48 (only one shown in FIG. 3). The support rods 48 extend essentially in the embodiment shown parallel to the longitudinal direction of strainer cloth 42, but may also extend diagonally to it. The primary function of the support rods 48 is to provide a support for the strainer cloth portion 42' when the material, such as drill cuttings 29, to be cleaned is supplied to it.

The support rods 48 are thus in contact with the upper strainer cloth portion 42'. In the embodiment shown the support rods 48 are provided with an oscillating source 36 producing vibrations being transferred to the drill cuttings. The oscillating source 36 may be such as an ultrasonic source. Alternatively or in addition the oscillating source 36 may be positioned in an open, liquid filled vessel where the vibrations are transferred via the liquid to the strainer cloth portion 42' as explained in the Norwegian patent NO 326594 by the applicant.

To facilitate separation of hydrocarbons from the solid particles, there may be added a suitable fluid to the material in the form of a washing agent as explained earlier. In the embodiment shown the washing agent is added to the material by means of nozzles 50 in communication with one or more washing agent containers 55. By using multiple containers, the washing agent being added for example via the first sluice device 20, may be different from the washing agent being added via the nozzle 50 arranged above the upper strainer cloth portion 42' and/or the nozzle 50 arranged below the upper strainer cloth portion 42'.

The apparatus 1 is further allocated a temperature-raising device 52. The temperature-raising device 52 may for example be a radiation device giving off heat and/or radiation in the microwave range. The radiation device 52 is directed toward the material on the upper strainer cloth portion 42'.

The apparatus 1 in FIG. 3 is thus arranged to both being able to separate solid particles above a certain predetermined size from fluids, as known from a strainer apparatus described in for example Norwegian patent NO323519, and at the same time being able to further clean such as drill cuttings of hydrocarbons. The apparatus 1 will not require more space than the space required by the said known strainer apparatus, but will result in a considerably better cleaning of the drill cuttings 29.

To prolong the retention time for the drill cuttings on the strainer cloth portion 42', that is to increase the time the drill cuttings are exposed to the under-pressure, at the same time as the capacity of the apparatus 1 is maintained, two or more strainer cloths 42 with appurtenant turning rollers 44 may be positioned partly overlapping each other in the vertical direction. In such an embodiment the above mentioned suction device 46 may be positioned on one of, some of or all of the two or more strainer cloth portions 42' of the strainer cloths 42.

Hydrocarbons being cleaned out from the solid particles will in the embodiment shown, be led out through the line 5 together with other fluids. Such other fluids may for example be drilling mud and/or washing agents. In some cases separated hydrocarbons may be returned together with the drilling mud down into a well, or the fluids led out through the line 5 may be led into a cleaning device such as a separator of a per se known kind to be able to separate gas fractions from liquid fractions and to possibly be able to separate different liquid fractions from each other. Such a cleaning downstream of the apparatus 1, is however not a part of the present invention.

It is to be understood that the apparatus 1 shown in FIG. 3 may be in communication with an upstream strainer apparatus as shown for the apparatus shown in FIG. 2. In such a solution the primary task of the apparatus 1 will be to clean for example drill cuttings of hydrocarbons.

Figure 4:
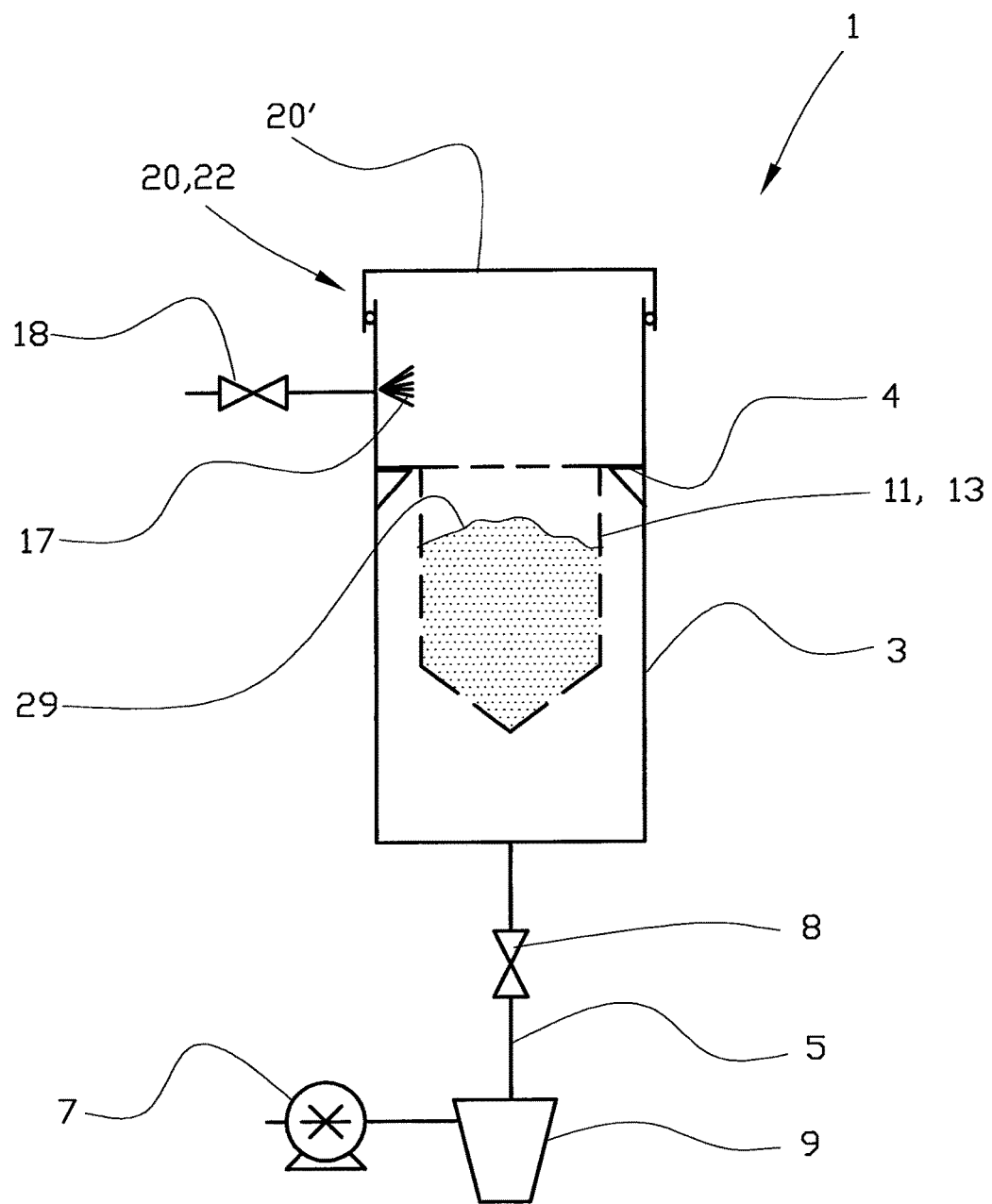
FIG. 4 shows a further alternative embodiment of the apparatus according to the present invention, wherein the apparatus is provided with a common inlet and outlet portion.
Figure 5:
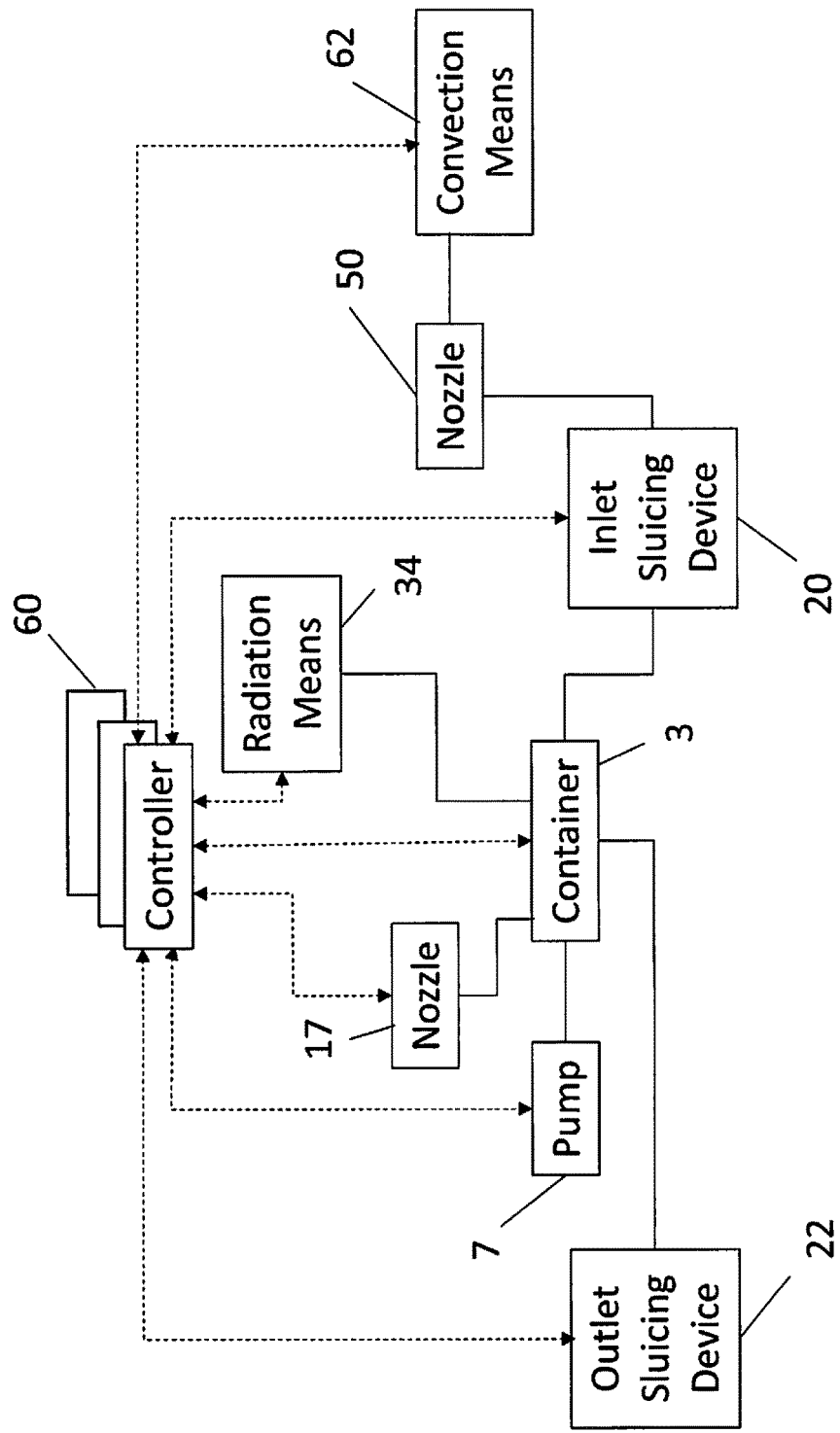
FIG. 5 is a block diagram showing the features of the invention.

In FIG. 4 is shown a further alternative embodiment of the present invention. The embodiment is different from the preceding embodiment examples in two areas. The support body 11 is constituted by a holding device 13 in the form of an open vessel arranged to be able to hold received solid particles or drill cuttings 29 stationary while separation of hydrocarbons from this goes on; and the inlet portion 20 is common with the outlet portion 22.

The holding device 13 is releasably located on a shoulder 4 inside a container 3 and spaced from the container's 3 internal wall portions. The holding device 13 is further provided with perforations. These are shown in dotted lines.

The container 3 is provided with an inlet portion 20 that may be closed. In the embodiment shown the closing of the inlet portion 20 is provided by means of a tight closing and removable cover 20' that is removed when solid particles are led into or being poured from the holding device 13.

An under-pressure generating device in the form of a vacuum pump 7 is by means of a line 5 in fluid communication with the internal portion of the container 3. A knock-out drum 9 is between the vacuum pump 7 and a valve 8 of a per se known kind.

After the contaminated solid particles are brought into the container's 3 holding device 13, the cover 20' is closed and under-pressure is generated in the container 3 by means of the vacuum pump 7. To facilitate separation of hydrocarbons from the solid particles a washing agent or cleaning fluid is led into the container by means of a spreader device 17. The washing agent is of the kind explained above. Feeding of the washing agent is controlled by means of a valve 18 of a per se known kind. The valve 18 may also act as an inlet valve or a pressure relief valve for the under-pressure in the container so that the cover 20' may be removed.

After the solid particles are sufficiently cleaned of hydrocarbon, the cover is opened and the solid particles are brought out of the container 3 for example by means of a not shown lifting device.

The apparatus shown in FIG. 4 is a static and batch-wise process where the material being cleaned is at rest while cleaning is going on, and where the container 3 is at atmospheric pressure while filling and emptying is going on.

To be able to continuously receive and treat contaminated solid particles such as drill cuttings 29, two or more apparatuses 1 of the kind shown in FIG. 4 are required. It is however to be understood that the vacuum pump 7 and the knock-out drum 9 may be common for two or more apparatuses 1. The individual container 3 may be connected to or disconnected from the vacuum pump 7 by means of the valve 8.

The apparatus 1 shown in FIG. 4 is particularly suited for use in cleaning of for example a littoral zone soiled by spilt oil, where the contaminated material after cleaning is to be returned to the littoral zone and where continuous supply is not as important as for example in a drilling process on board a drilling rig.

The apparatus 1 as shown in the FIGS. 1-5 may be provided with sensors and control devices (60) to be able to control one or more of the parameters temperature, under-pressure, feeding rate and supply of possible washing agents.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A solid particle treating apparatus (1) for cleaning hydrocarbon contaminated solid particles (29), said solid particle treating apparatus (1) comprises:
   an inlet sluicing device (20) configured to be connected to a strainer outlet (43) in a fluid tight manner, a multi-vane rotor, a first washing agent supply nozzle (50) to supply a first washing agent, and a temperature raising convection heat transfer means;
   an outlet sluicing device (22);
   a container connected to the inlet and outlet sluicing devices, the container comprising within an interior space of the container a second washing agent supply nozzle (17) to supply a second washing agent, a temperature raising radiation heat transfer means, and a tubular holding device (13) arranged coaxial to the container and at a lower elevation than the second washing agent supply nozzle;
   the tubular holding device comprising a feed screw (12), and including openings (13') located along an upper surface of the tubular holding device;
   a vacuum pump (7) connected to the container via a line (5) at a lower elevation than the container; and
   one or more control devices configured to control one or more of temperature, under-pressure, and a feeding rate of the first and second washing agents.

2. An apparatus according to claim 1, wherein the second washing agent supply nozzle (17) is to compensate for fluid evacuated from the container (3) by means of the vacuum pump (7).

3. An apparatus according to claim 1, wherein the first washing agent supplied by the first washing agent supply nozzle is a heated washing agent.

4. An apparatus according to claim 1, wherein the temperature raising radiation heat transfer means is a microwave device.

5. An apparatus according to claim 1, where the container further comprises within the interior space a manifold including the second washing agent supply nozzle.

6. An apparatus according to claim 1, wherein the tubular holding device is further provided with an oscillating device (36) arranged to vibrate solid particles (29) being carried by the feed screw.

7. An apparatus according to claim 1, further comprising a strainer apparatus (40) arranged upstream of the inlet sluicing device (20).

8. An apparatus according to claim 1, further comprising a strainer apparatus (40), including a strainer cloth (42').

9. An apparatus according to claim 1, wherein the outlet sluicing device includes a multi-vane rotor.

* * * * *